June 13, 1967 — J. A. SAFFIR — 3,324,552
DENTAL HANDPIECE
Filed April 6, 1964 — 2 Sheets-Sheet 1

INVENTOR
JACOB A. SAFFIR
BY Frederick W. Turnbull
ATTORNEY

June 13, 1967  J. A. SAFFIR  3,324,552
DENTAL HANDPIECE
Filed April 6, 1964  2 Sheets-Sheet 2
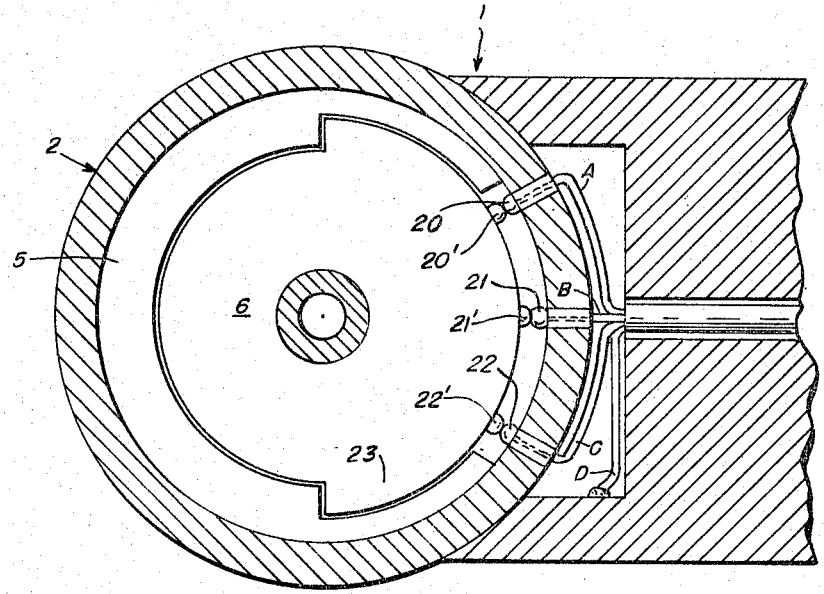
FIG. 2
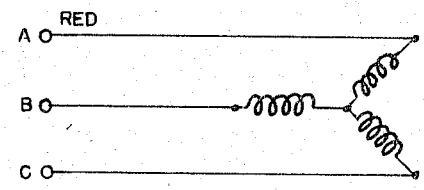
FIG. 3
FIG. 4
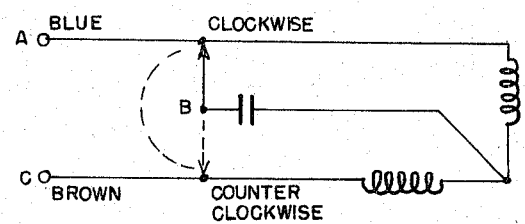
INVENTOR
JACOB A. SAFFIR
BY Frederick W. Turnbull
ATTORNEY

United States Patent Office 3,324,552
Patented June 13, 1967

3,324,552
DENTAL HANDPIECE
Jacob A. Saffir, 6530 W. 5th St.,
Los Angeles, Calif. 90048
Filed Apr. 6, 1964, Ser. No. 357,650
9 Claims. (Cl. 32—26)

This invention relates to a dental handpiece, especially for rotating drills at high speed, and in either direction.

Turbine driven handpieces have been developed that are very effective but are not reversible. Also, air under pressure within required limits is not always available, whereas electric power is almost universally available.

Handpieces have long been used which are driven by an electric motor through a joined frame arrangement including a cord running over pulleys arranged at the joints of the frame. While such handpieces can provide adequate power, they are of comparatively low rotational speed, and, on this basis, are not competitive with turbine driven handpieces. Turbine driven handpieces, however, are not as susceptible to variable speed as is required many times so they, too, leave something to be desired.

Handpieces having an electric motor in the handle of the handpiece itself also have been suggested but have not proven satisfactory, and therefore have not been widely accepted.

The handpiece of the present application avoids the difficulties enumerated and has a primary object to provide a simple handpiece in which the electric motor is readily replaceable.

A further object is to provide a high speed handpiece that is driven by a reversible electric motor.

Other and further objects and advantages will appear from the following specification taken with the accompanying drawing in which like reference characters refer to like parts in the several views and in which:

FIGURE 2 is a fragmentary section taken on line 2—2 of FIGURE 1; and

FIGURES 3 and 4 are wiring diagrams for use with the motor.

Figure 1:
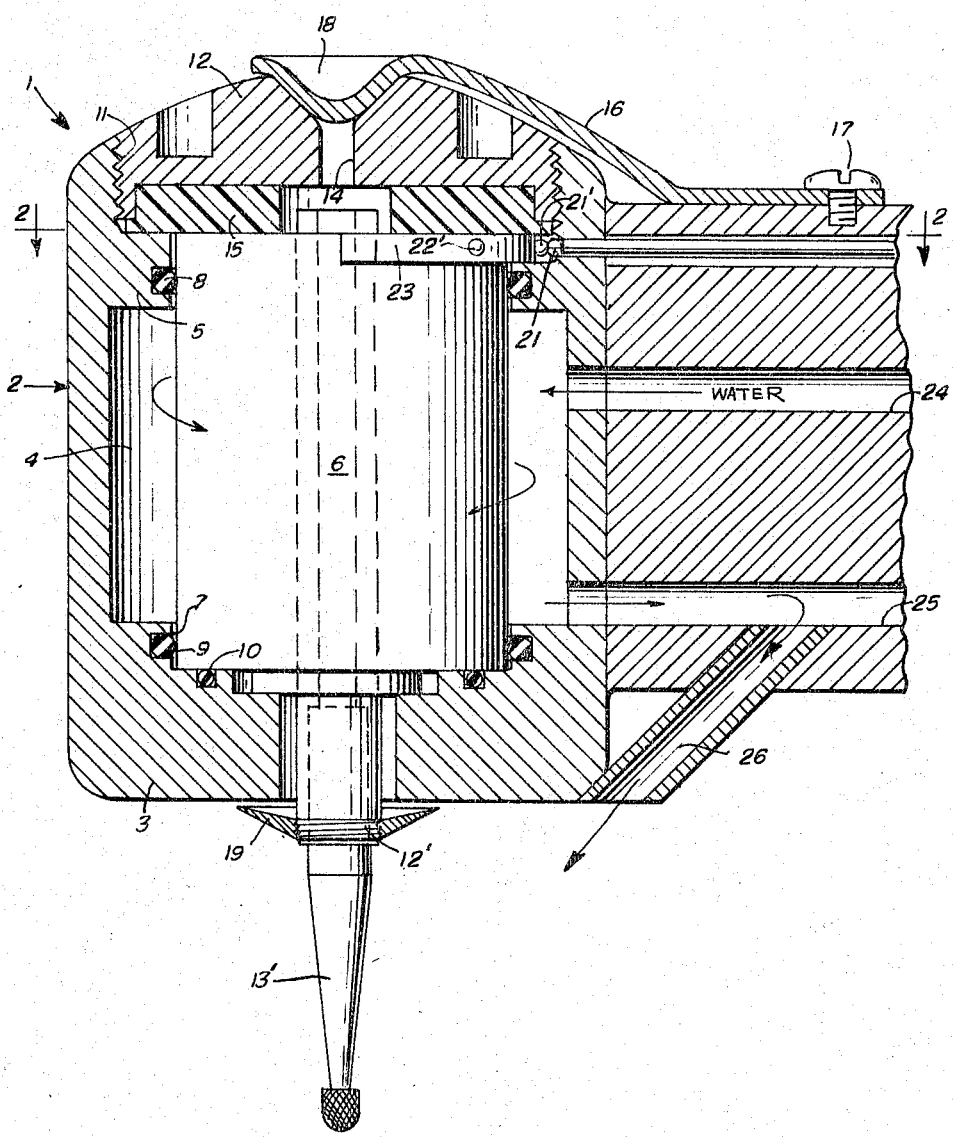
FIGURE 1 is a fragmentary sectional view of a handpiece with the motor shown in elevation.

In FIGURES 1 and 2 the handle of the handpiece is seen at 1. This handle is of the conventional size and shape that has been found to be convenient for dentists' use. Head 2 of the handpiece is generally tubular and is provided at the lower end with a centrally apertured bottom 3, a hollow portion 4 and an inwardly extending annular flange 5 having its inner diameter only slightly larger than a motor 6. Bottom 3 is formed with an annular shoulder 7 to receive and center the motor in the head. O-rings 8, 9 and 10 preferably are provided to resiliently and sealingly hold the motor in position.

The upper part of the head 2 may be threaded interiorly at 11, to receive the removable cover 12 which may conveniently be provided with depressions 13, to be engaged by a spanner wrench, and a central aperture 14. A resilient sealing element 15 is interposed between the cover 12 and the motor 6. Element 15 may be provided with co-engaging annular ribs and grooves to minimize leakage of water. A spring arm 16 which is pivoted to the handle of the handpiece at 17, is provided with a convex closure portion 18 that sealingly engages the edges of aperture 14 to prevent ingress of water or dirt when the handpiece is in use.

The shaft 12' of the motor is bored to receive the shank of a dental bur 13' and, if desired, also to receive a suitable chuck, not shown, therein to directly receive the bur shank if desired. Also, the bore of the shaft 12' extends therethrough for the entire length thereof and is coaxial with aperture 14 in cap 12, whereby a pin-like means may be extended through aperture 14 and the shaft bore to remove a broken bur shank, for example. Said shaft cannot be absolutely sealed against axial leakage of water along it, though any conventional means may be used to minimize such leakage. In order to further minimize such leakage, however, a ring flange 19 is mounted on the shaft adjacent the aperture. Any water or dirt that comes in contact with the flange 19 when the motor is running will be thrown radially away from the shaft, and from the shaft aperture in bottom 3 of the head 2.

Electric motor 6 is of the reversible type encased in a cylindrical frame. FIGURES 3 and 4 indicate diagrammatically wiring that may be used according to the motor selected. The three wires A, B and C from the motor, in FIGURES 3 and 4 are seen also in FIGURE 2. Each wire A, B, and C in FIGURE 2 makes its connection to the motor 6 by means of contacts 20, 21 and 22 mounted in the wall of the cutaway portion of the housing engaging elements 20', 21' and 22' respectively, that are shown as contact "buttons" in each case mounted in a flange 23 on motor 6.

The flange 5 of the head 2 is cutaway arcuately to provide a recess to receive flange 23 of the motor and thereby serves to position the motor arcuately within the head. Complementary contact button 20, 21 and 22 are mounted in the wall of the cutaway portion of the housing and are located so that, only when the flange 23 is seated in the cutaway portion of flange 5 will the contacts 20, 20'; 21, 21'; and 22, 22' be in contact, and there is only one position of the motor possible when the handpiece is assembled.

The wires A, B, and C lead from the handpiece to a reversing switch (not shown as it is standard equipment) that may be foot operated.

An inlet passage 24 is provided in the handpiece that may be used to provide cooling water to the space 4 surrounding the motor, and an outlet passage 25 removes the water. Some of the water may be diverted from the outlet passage to flush the area of a tooth that is being drilled or cool the bur, through a nozzle passage 26. Alternatively, air could be provided through the passage 24. If the handpiece is designed especially for use with air, a minute channel from space 4 to the aperture in bottom 3 would preferably be provided to place the space surrounding shaft 12' to a higher-than-atmospheric pressure which will effectively prevent leakage of water along shaft 12', so that flange 19 may be omitted under such circumstances.

Since water or air pressure is not used as the source of power, very low water or air pressures may be used for motor cooling.

A ground wire D is secured to the head, and passes through the handpiece to be connected to a ground to avoid any possibility of even a low voltage current from the device being grounded through the patient.

From the foregoing, it will be seen that the motor may be mounted within and removed from the head of the handpiece easily and in a fool-proof manner to insure desired completion of the electric circuits to and from said motor. Also, the central portion of the motor is sealed automatically in leak-proof condition with respect to fluid, of either liquid or gaseous type, circulates around the housing of said motor to cool it while operating through the use of O-rings engaging the opposite ends of said motor. These O-rings also cooperate with other resilient supporting means to insulate the motor from direct metallic contact with the housing of the handpiece; thereby minimizing noise from vibration and insuring smooth operation of the handpiece.

I claim:
1. A dental handpiece comprising an elongated handle and a head mounted on one end thereof, said head being of a size readily accommodated within the oral cavity of a human being and having a cavity therein which is open at one end of said head, a cap complementary to said opening and removably engaging said head to close said opening, the opposite end of said head having another opening therein of smaller diameter than said open end of said head, a miniature size enclosed electric motor complementary in size to said cavity in said head and having an armature shaft projecting from one end thereof, said end of said shaft being arranged for connection of a dental tool thereto, electrical conductors of a circuit connectable to a source of current and extending along said handle and having contacts adjacent a wall of said cavity, contacts on said motor complementary to those on said cavity wall, and interengaging indexing means respectively on said head and the outermost end of said motor when mounted in said cavity and arranged to be coengaged only when positioned in a single predetermined relationship in which said contacts are in engagement to establish an electric circuit to said motor, said armature shaft projecting through said another opening in said opposite end of said head.

2. The dental handpiece according to claim 1 in which the intermediate portion of said cavity between the opposite ends thereof is provided with an annular enlargement and said handle is provided with a plurality of conduit means respectively extending to and from said enlargement for the circulation of cooling water around said motor to absorb heat therefrom, and fluid-tight sealing means between said motor and the opposite ends of said annular enlargement to prevent the escape of water therefrom toward the ends of said motor.

3. The dental handpiece according to claim 2 in which a nozzle passage leads from said conduit means which extends from said enlargement and is directed toward a dental tool when mounted upon said armature shaft to direct cooling water thereto when operating.

4. The dental handpiece according to claim 2 in which said electrical contacts on said motor are between one of said sealing means and the adjacent end of said motor to seal said contacts against contact by said cooling water.

5. The dental handpiece according to claim 2 in which said sealing means are compressible rings and said walls of said cavity have complementary recesses partially receiving said rings to position the same.

6. The dental handpiece according to claim 5 which further includes compressible insulating means respectively between the opposite ends of said motor and said cap and opposite end of said head, whereby said motor is cushioned within said head against direct contact with said head and thereby minimizes noise and vibration of said motor being transmitted to said head.

7. The dental handpiece according to claim 1 in which said head has an inwardly extending flange adjacent said open end of said cavity provided with a recess in the outer face thereof and said indexing means comprises a laterally extending projection on said motor complementary to said recess and positioned to receive the same when said motor is fully seated in operative position within said cavity in said head.

8. The dental handpiece of claim 1 in which said contacts are carried by said indexing means.

9. The dental handpiece of claim 1 in which the motor shaft is bored throughout its length and said cap has a central aperture therein coaxial with the bore of said shaft, whereby pin-like means may be inserted through said aperture and into said bore to remove a broken bur shank, and closure means removably mounted to cover said aperture in said cap.

References Cited

UNITED STATES PATENTS

| 2,396,007 | 3/1946 | Happe et al. | 310—50 X |
| 3,134,172 | 5/1964 | Sato | 32—27 |
| 3,136,059 | 6/1964 | Nelson | 32—28 |

FOREIGN PATENTS 917,975   2/1963   Great Britain.

RICHARD A. GAUDET, *Primary Examiner.*

ROBERT E. MORGAN, *Examiner.*